Aug. 23, 1932.  W. S. JOSEPHSON  1,873,131
REFRIGERATING APPARATUS
Filed Dec. 12, 1929  2 Sheets-Sheet 1
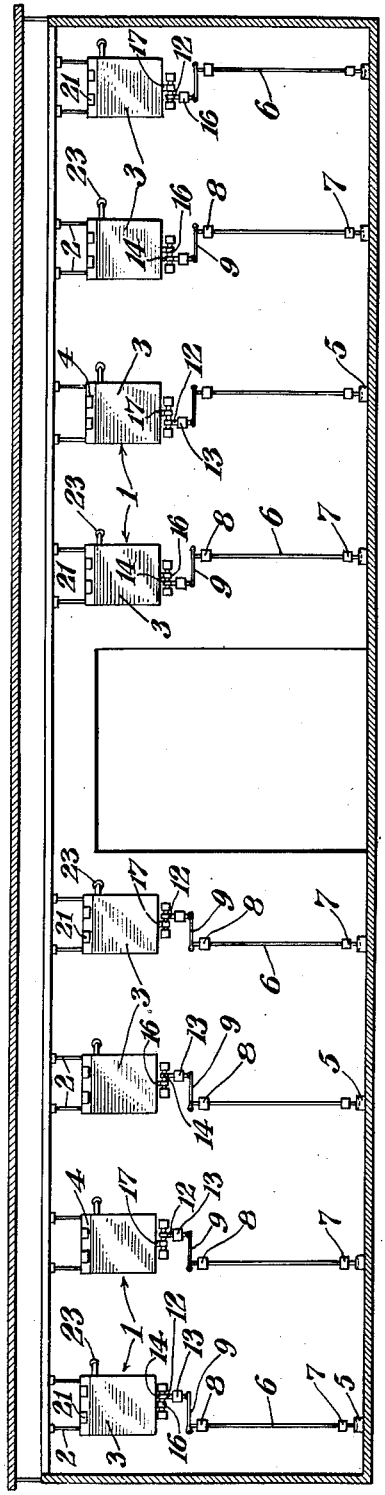
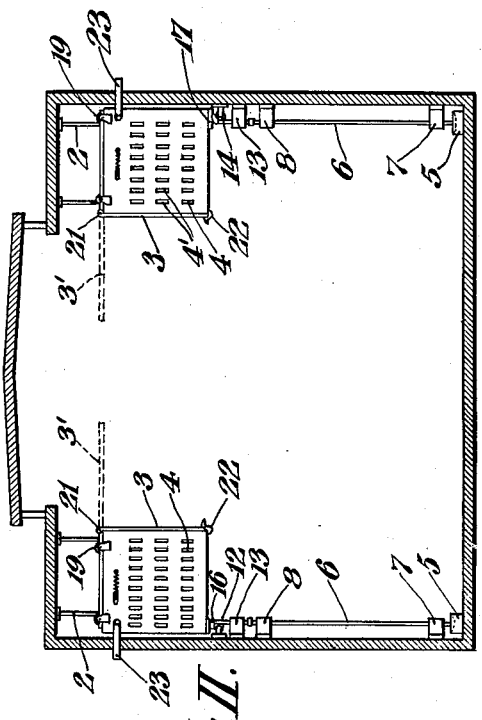
INVENTOR
Walter S. Josephson
BY
Charles Holland
ATTORNEY Aug. 23, 1932.  W. S. JOSEPHSON  1,873,131
REFRIGERATING APPARATUS
Filed Dec. 12, 1929   2 Sheets-Sheet 2
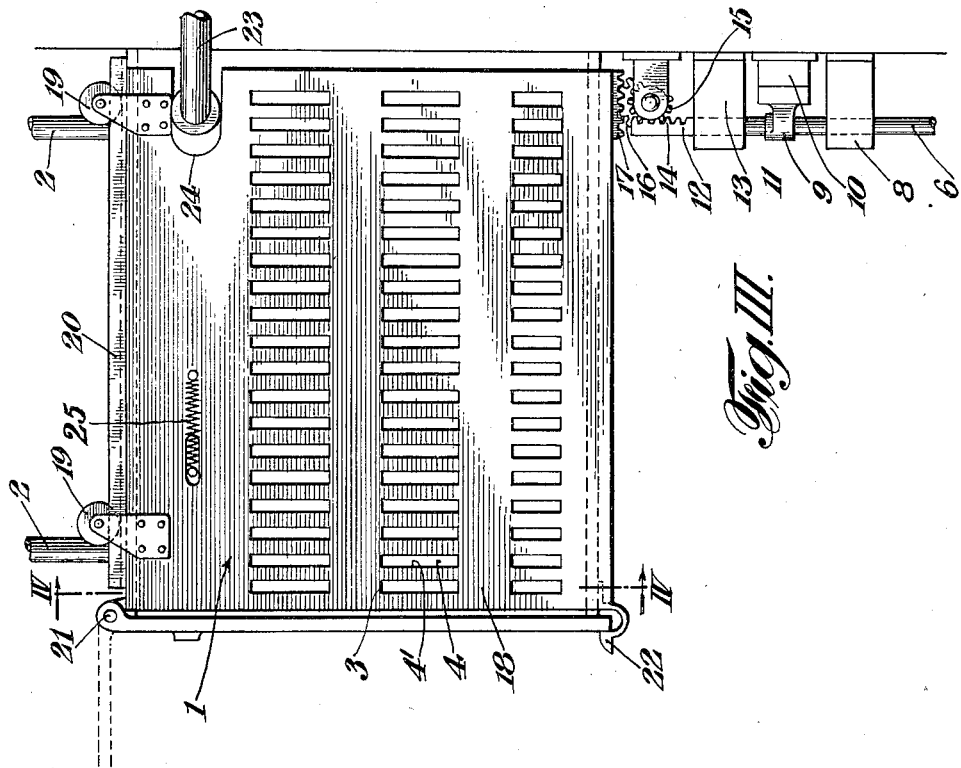
Fig. III.
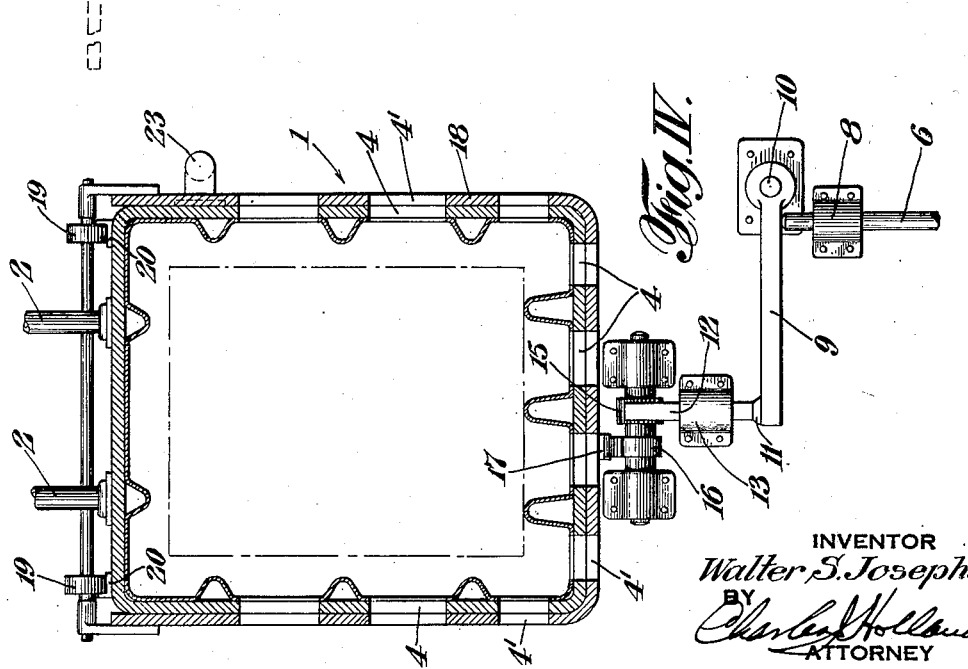
Fig. IV.
INVENTOR
Walter S. Josephson
BY
Charles Holland
ATTORNEY Patented Aug. 23, 1932

1,873,131

UNITED STATES PATENT OFFICE

WALTER S. JOSEPHSON, OF NEW YORK, N. Y., ASSIGNOR TO DRYICE CORPORATION OF AMERICA, OF NEW YORK, N. Y., A CORPORATION OF DELAWARE

REFRIGERATING APPARATUS

Application filed December 12, 1929   Serial No. 413,466.

The present invention relates to refrigerating devices and more particularly to a novel form of such device provided with a thermostatic control that renders it responsive to severe climatic changes or wide variations of temperature in the atmosphere surrounding the outer walls of the refrigerated space.

It is an especial object to provide a form of refrigerating device that is adaptable for use in refrigerating cars carrying cargoes of perishable products, such as fruit, etc., from warm climates to cold climates, or from warm climates to other warm climates over mountain ranges of high altitudes where sudden severe changes of temperature are experienced en route. It is a further object to provide a device of this description for household and general use which automatically regulates the temperature in the refrigerated space at a point higher than the freezing point of water and which thus prevents temperatures within the refrigerated space that are dangerous to or even destructive of the perishable articles to be refrigerated.

In my copending application for patent, Serial No. 399,911, I have described and claimed upon a refrigerating material consisting of hydrated carbon dioxide in solid form and upon a method of manufacturing this material. It is made clear in that copending application that the water content of the solid refrigerant can be predetermined and regulated in accordance with certain principles therein set forth and that a block so formed is suitable for maintaining within the space to be refrigerated a temperature which is constant within certain desired limits. In other words the water content possesses the property, among others, of affording a natural thermostatic control of the temperature within the refrigerated space. This is especially the case where there are no sudden wide variations of temperature outside the walls of the refrigerated space.

Where, however, due to sudden changes of climate between one region and another through which a refrigerator car may travel, or due to sudden changes of weather in a particular locality, wide variations of temperature occur, the balance between the temperature within and without the refrigerated space may be disturbed with destructive effect upon the fruits, vegetables, meats or other perishables within the refrigerated space. The danger is ordinarily to be ascribed to the occurrence of too low a temperature—a temperature, for instance, long continued below the freezing point of water.

By the device of the present invention this difficulty is overcome. A container is provided having a corrugated lining to support the block of solid refrigerant out of contact with the container walls. This container is especially adapted to the uses of the refrigerant, described and claimed in my said copending application Serial No. 399,911.

The invention will be illustrated in its application to a refrigerator car, the walls of which are insulated with a material such as hair felt. Briefly described, it comprises a container having slots in the sides through which the gas from the melting block may escape into the refrigerated space and provide therein at temperatures normal to the climate of the region in which the cargo is embarked, a cold sterile, hydrated and sustaining atmosphere. By means of a closure arranged about the container operated by a mechanism which is responsive to a drop in temperature to a point above the freezing point of water, the slots may be shut and the supply of cold hydrated carbon dioxide gas thus cut off.

The closure operating mechanism includes a cartridge located in the coldest part of the car which is ordinarily at the floor or beneath it. So long as the temperature outside the car is higher than the regulated temperature within it, the slots on the refrigerant container remain open and the moist carbon dioxide gas from the melting block within escapes into the interior of the car. When, however, the outside temperature drops below the regulated inside temperature, and there occurs an appreciable drop in the refrigerated space, the cartridge operates a mechanism to correct this condition. This cartridge is filled with a liquid that freezes at a temperature higher than the freezing point of water and as soon as this temperature is reached, the whole operating mechanism is set in motion and the gas is shut off before the water content of the materials to be refrigerated freezes.

The operation will be more clearly understood from the drawings to which reference is now made.

Fig. I of the drawings shows a sectional elevation of one side lengthwise of a refrigerator car with the containers and thermostatic controls thereof in place.

Fig. II is a section of a car taken crosswise thereof.

Fig. III shows details of the container and of the operating mechanism of the thermostatic control.

Fig. IV is a section on the line IV—IV of Fig. III.

In all the figures, like numerals indicate like parts.

In the figures, containers, 1, each holding a block of the refrigerant are suspended from the roof of the car by the rods, 2. The containers are represented in Fig. I with their doors, 3 closed. Two sides and the bottom of these containers at right angles to the doors, 3, are fitted with slots, shown in Fig. II at 4.

A slidable false wall or closure, 18, of Fig. III, having slots, 4', fits snugly on three sides of the container, 1, to wit, the bottom and the two sides. This closure, 18, together with the mechanism indicated in Fig. I and shown in detail in Figs. III and IV constitute a thermostatic control for the refrigerated space.

A container which, for convenience, I have termed in this specification, a cartridge, and which is numbered, 5, in the drawings, is located at the floor. This cartridge has a flexible and expansible top, and is filled with a liquid or mixture of liquids having a higher melting point than water. I prefer to use for the liquid filler of the cartridge a mixture of benzol, 29 parts by volume and ortho toluene, 1 part by volume. The melting point of benzol is approximately 41° F. (5.483° C.); and that of ortho toluene is $-139°$ F. ($-95°$ C.). Accordingly 29 parts of benzol mixed with 1 part ortho toluene has a melting point of approximately 35° F. This mixture contracts on solidifying, the difference between the specific volume of the liquid and the solid being between approximately .1219 and .1304 at about 35° F. or roughly about one eighth in volume. The proportions of the mixture may, of course, be varied either to obtain a different melting point or a different degree of expansion or contracting on melting or freezing. Other materials or combinations of materials may also be used with advantage, so long as they produce the desired effect. A rod, 6, connects with the top of the cartridge, 5, and is held to the sides of the car as at 7 and 8, the mode of holding being such as to allow the rod, 6, free movement vertically.

A lever, 9, pivoted at 10 rests upon or connects with the upper end of the rod, 6. At the free end of the lever, 9, is a bearing, 11, on which rests a rack, 12. The rack, 12, is fastened to the car wall at 13, the fastening being such as to allow free vertical movement. The top portion of the rack, 12, through its teeth, 14, Fig. III engages the pinion, 15, also shown in Fig. III thus affording a rack and pinion movement. Through an extension or gear sector, 16, of the pinion, 15, engaging with the rack, 17, which is integral with the slidably mounted closure, 18, movement is imparted to the closure, 18, when the rack, 12, moves in an upward direction thus bringing the slots 4 and 4' into register. In this position, the spring, 25, is tensioned. When, however, the cartridge mixture solidifies and the pressure is correspondingly released, the spring, 25, pulls the closure, 18, in the opposite direction so that the slots 4 and 4' are out of register. The movement of the closure, 18, is facilitated by the fact that the slotted sides of said closure are provided with wheels, 19, running on tracks, 20, on the upper side of container, 1.

The door, 3, of the container, 1, may be opened by raising it by its hinges, 21, to the position indicated at 3' in Fig. III to permit the block of refrigerant to be placed within the container, 1. In its closed position the door is held tightly shut by the catch, 22, shown in the same figure. When the closure, 18, is in such position as to shut the slots, 4, of the container, 1, there is a certain quantity of gas, $CO_2$, being given off from the block which normally would pass through the slots, 4, but which is then prevented from doing so. The container, 1, is, therefore, provided with vents, 23, which permit the excess of this very cold gas to pass through the walls of the car to the outside air. The closure, 18, may be provided with an indent, 24, to permit it to move without interference from this vent or by another arrangement the vent may be placed on a side of the container, 1, that is not not covered by the closure, 18. The transference of heat from the outside of the car to the inside, or vice versa, may be prevented or retarded by packing the walls with an efficient insulator such as hair felt.

The operation of the device is as follows:

In the first place, the desired degree of movement depends upon the width of the slots, 4, in the container, 1. This determines also the size and shape of the cartridge, 5, and the nature and volume of the filler thereof as hereinafter set forth.

When, therefore, the mixture of benzol and ortho toluene in the proportions above specified entirely fills the cartridge, 5, at temperatures above 35° F., the louvres of the container, 1, are open to the fullest extent and the spring, 25, is under tension. The slots, being open, permit the cold hydrated gas to fall through into the refrigerated space. As soon, however, as the temperature falls below 35° F., the melting point of the mixture in the cartridge, 5, the mixture solidifies and contracts. The pressure on the spring, 25, is thus relieved and as the spring, 25, extends itself in response to this relief, the closure, 18, moves to block the slots of the container, 1, so that no more of the cold gas is admitted to the refrigerated space. Any excess of gas due to melting of the block in the container, 1, after the slots are closed may be permitted to flow outside the refrigerated space through the vents, 23.

The movement required to close the slots may be very slight indeed or as large as desired and its extent depends upon the width of the individual slots. As the cartridge mixture contracts about one eighth of its volume and as the extent of the movement is controlled by this contraction, the control is effected by the size and shape of the cartridge, 5, assuming, of course, a complete filling thereof with the cartridge mixture at 35° F.

If, therefore, a perishable cargo such as fruit is placed in a car in a warm climate such as that of California and sent East over the high mountain altitudes or to colder latitudes great climatic variations will be experienced. Temperatures sufficient to freeze water may be met with and in such case there is danger of destruction to the cargo. When this happens, the whole apparatus becomes very much less effective as a refrigerating device and the heavy, cold gas from the block passes to the outside of the refrigerated space through the vents 23. As soon, however, as the temperature rises above 35° F., the mixture within the container again becomes liquid and expands and forces the rod, 6, upwards and thus, through the rack, 12, and pinion, 15, opens the slots of the container, 1, so that the device becomes once more operative.

It is obvious also that where space is such as to make it convenient, the rack, 12, may be actuated directly from the cartridge, 5, without the intermediate elements comprising the rod, 6, and lever, 9. Or, hydraulic means may be employed as for example, a hollow cylinder or pipe having flexible and expansible caps at the ends one of which contacts with the rack, 12, and the other with the cartridge, 5. This cylinder may preferably be filled with an oil such as door check oil, and as the mixture in the cartridge contracts or expands, the oil moves accordingly and exerts or releases its pressure under the rack, 12.

While I have illustrated the device of this invention by its application to a refrigerated railroad car, it is obvious that it is equally adaptable to any space which is desired to be refrigerated and in which it is either desirable or necessary to maintain a predetermined temperature. It is for example applicable to, and of great utility in an ordinary household refrigerator.

It is also obvious that many changes and variations may be made in the arrangements shown and described, without departing from the spirit and scope of the invention and I desire to include all such within the claims hereof.

What I claim is:—

1. A refrigerating apparatus including a refrigerator enclosing a normally ventilated container of hydrated solid carbon dioxide refrigerant, a slotted closure element mounted upon said container and means for moving said closure element slidably upon said container from a position in which said closure slots register with said container slots to a position in which said closure slots are out of register with said container slots.

2. A refrigerating apparatus comprising in combination a container for a refrigerant having openings on the sides thereof and means for closing said openings said means including a false wall slidably mounted on said container having openings corresponding to the openings on the sides of said container, a gear integral with said false wall, a pinion adapted to mesh with said gear, a rack adapted to engage said pinion and a cartridge filled with a mixture the melting point of which is higher than the freezing point of water so positioned in relation to said rack as to cause said rack to move when said mixture solidifies or melts.

3. A refrigerator for enclosing products to be refrigerated and means therein to refrigerate the same, including one or more containers enclosing solidified hydrated carbon dioxide, said container having means through which the evaporated gas escapes therefrom into the refrigerated space, means for limiting or preventing such escape, and means for discharging the gas outside the refrigerated space when the latter means operates.

4. A refrigerator adapted to enclose products to be refrigerated and means therein for refrigerating it, including one or more containers enclosing solidified carbon dioxide and having openings at different levels for permitting outflow of evaporated gas from and inflow of atmosphere between said container and the refrigerated space, and means for limiting or preventing such escape and means for discharging the gas outside of the refrigerated space when the latter means operates.

5. A refrigerator adapted for enclosing products to be refrigerated and means therein to refrigerate the same, including one or more containers enclosing solidified carbon dioxide and having low level outlet means through which the evaporated gas from within said container passes into the refrigerated space, means for closing the latter, and a high level outlet conduit for discharging excess gas from the container outside the refrigerator.

6. A refrigerator adapted to enclose products to be refrigerated and means therein for refrigerating it, including one or more containers enclosing solidified carbon dioxide, openings at different levels for permitting escape of evaporated gas from within said container into the refrigerated space, thermostatic motor operated means for limiting or preventing such escape and means for discharging the gas outside of the refrigerated space when escape thereof to the refrigerated space is prevented.

In witness whereof, I have set my hand hereto this 5th day of December, 1929.

WALTER S. JOSEPHSON.